Figure 1:
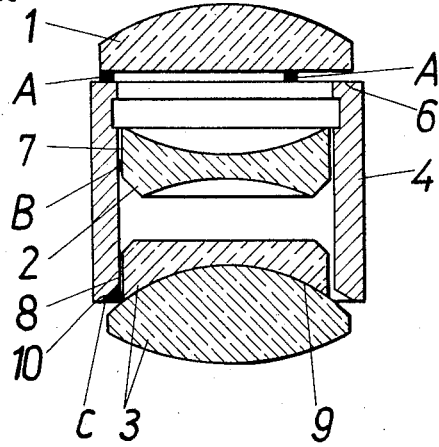

July 14, 1959     K. SCHUCH     2,894,430
MOUNTS FOR A COMPOSITE OPTICAL LENS COMBINATION
Filed Aug. 31, 1956     2 Sheets-Sheet 1

Inventor:
Kurt Schuch

United States Patent Office 2,894,430
Patented July 14, 1959

2,894,430

MOUNTS FOR A COMPOSITE OPTICAL LENS COMBINATION

Kurt Schuch, Jena, Germany, assignor to VEB Carl Zeiss Jena, Jena, Germany

Application August 31, 1956, Serial No. 607,524

1 Claim. (Cl. 88—57)

The invention relates to a mount for a composite optical lens combination, such as a camera objective, the components of which must be fixed to their mutual positions after prior adjustment of their axial position and distances.

Centration of the lens elements of a multiple-element system relative to each other, preservation of the distances apart of the elements in conformity with the design of the optical lens system and strainless support particularly when sensitive, i.e. thin lens elements are concerned, cannot be achieved by means of the hitherto known methods and mountings without residual errors deleterious to the quality of the image produced by the system.

Mounts are known which have means for adjusting the mounted lens elements individually with respect to parallel displacement of the optical axis and distance apart. Complete adjustment requires however the elimination also of errors in the inclination of the optical axis of each element relative to a given reference axis, which may be a mechanical axis of the mount or the optical axis of an element already adjusted in it.

Also known are mechanically acting centering means with annular knife-edges giving each element automatically its required position, in which it is either retained by mechanical supports or embedded in sealed-in metal rings or in injected rings of plastic. The centering accuracy obtainable by such a method is dependent on the mechanical precision of the annular knife-edge and on the shape of the lens and cannot therefore meet highly exacting demands. Moreover, automatic centering by means of annular knife-edges is possible only when the angle of glide between the lens surface and the knife-edge is not too small. Some known mounts have elastic lugs permitting the lens element or the respective part of the mount to expand radially or axially, which means however that clamping forces act disadvantageously on the elements or that the elements lie slack in the mount parts, since to avoid pressure on the respective elements the elastic lugs are restrained in the direction of elasticity by fixed bearing surfaces.

The chief aim of the present invention is to eliminate or to reduce very substantially any and all sources of error which are due to mechanical marginal centering of the lens elements, to mechanically caused centering and wobbling errors of the mount parts, to play in the mount parts, to warp of thinkly walled parts, to inaccurate seating of the lens elements on their bearings, to inaccuracies consequent on the use of mechanically centering annular knife-edges and to the strain produced by the mounting of the lenses.

The invention permits the economically favourable production of a mount with the lens members mutually positioned with utmost precision, by cementing at least one of the members of the lens to the mount, expediently in several places, without the component having any other carrying connection with a part of the mount. It is of particular advantage, if all lens members following the first are attached in this manner.

Moreover, the mount itself need not be provided with the means of adjustment. The adjustment can be performed by means of an adjusting device which need be attached to the mount only temporarily.

With this type of mount it is possible to secure the lens components without clamping, and it is not necessary to provide a selection of different sizes for parts of the mount, or to perform any final or finishing operations on the mount components.

It is recommended that the cementing points of the mount, where the lens members are to be attached, should be designed in the shape of tongues which are at least radially elastic, so that it is possible to make the connection with the lens member without undesirable clamping forces acting on the fastening, or, in other words, so that the spring action of the tongues is made use of only in the case of shocks acting on the mount.

In the case of cementing at a plurality of points, the cementing points—of which it is expedient to provide three uniformly distributed over the periphery of the lens—can be positioned, for example, on the faces of the lens members. It is, however, more advantageous to arrange them only on the cylindrical bounding surfaces of the lens members so that, as far as possible, they are positioned in the centre of gravity plane lying at right-angles to the optical axis.

The lens mount of the invention permits differences in expansion due to heat between the components of the lens and the mount, and thus complies with the prerequisite for the use of materials having very different co-efficients of expansion, such as glass and light metal, without the occurrence of undesirable stresses due to changes of temperature. Moreover, the mount of the invention ensures that any clamping forces on the lens components, can act only in the direction of the greatest moment of resistance, i.e., transversely to the optical axis. Central tensional forces, such as may occur due to shrinkage of cement, are extremely small, and can be decreased still more by appropriately designing the elastic tongues, where these are used on the mount parts.

Figures 2, 3:
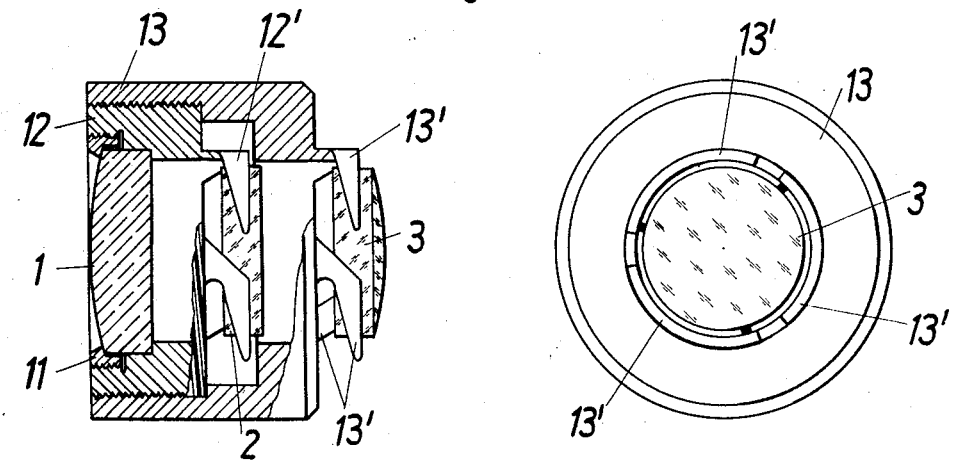
Figure 4:
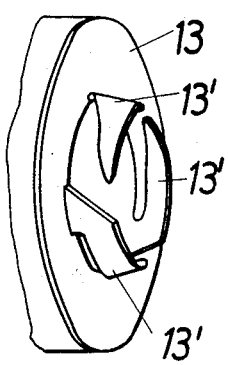
Figure 5:
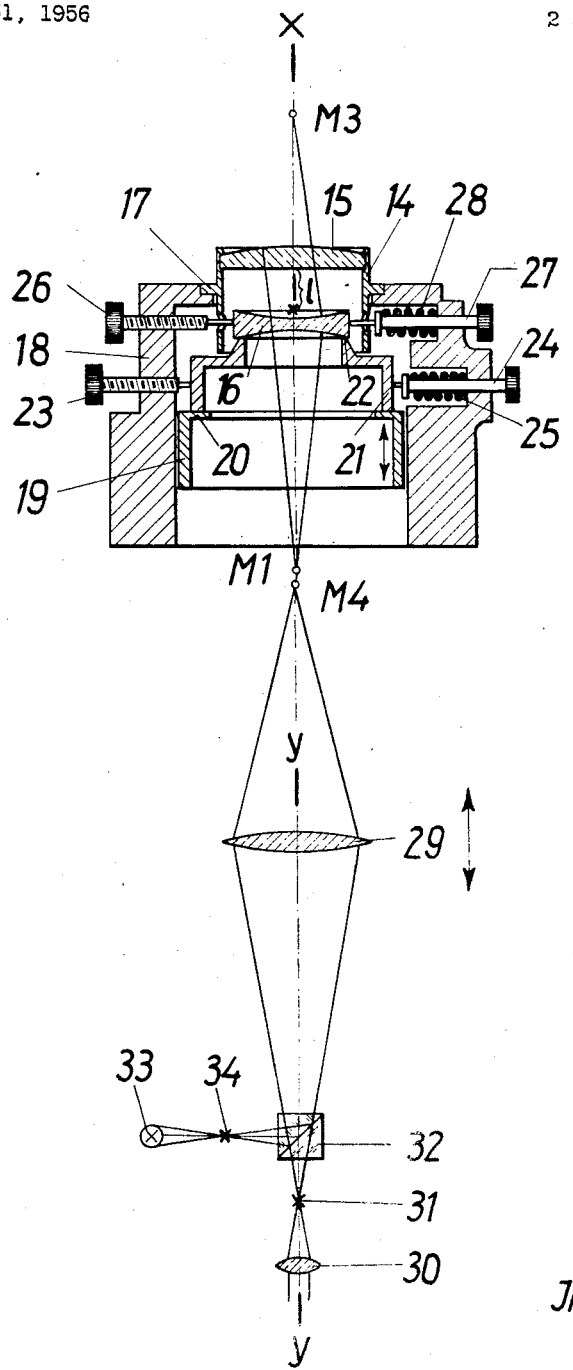

The drawing illustrates diagrammatically two different examples of construction of the lens mount of the invention for a three-glass lens, and an appliance which can be used, for example, for the adjustment of lens glasses. Figure 1 shows in a cross-section along the optical axis of the lens, a mount exclusively composed of rigid parts. Figures 2 to 4 show a mount two parts of which are equipped with elastic tongues, Figure 2 being a cross-section along the optical axis of the lens while Figure 3 shows a side view of the objective and Figure 4 a perspective view of a part of the mount equipped with spring tongues. Figure 5 shows an axial cross-section of an appliance for adjusting the second glass of a two-glass lens system, in relation to the first glass, which is fixed to the mount in the usual manner.

The lens illustrated in Figure 1 consists of two single glasses 1 and 2, of which 1 is the front glass of the lens, and of a pair of two glasses 3 cemented together which form the third member of the lens, and of which the diameter of the rear glass is somewhat larger than that of the front glass. A tube 4 serves as mount for all three lens members. The front glass 1 has a plane surface 5 at right-angles to the axis of the lens, and is cemented to one face 6 of the tube 4 at three points A uniformly distributed around the circumference of the face 6. The cylindrical bounding surface 7 of the glass 2 is cemented at three points B, evenly distributed over its periphery to the cylindrical surface 8 of the tube 4. The free portion of the cementing surface 9 of the glass 3 is cemented at three points C which are equally spaced around its periphery, to a conical end surface 10 of the tube 4.

It is to be recommended to insert a packing of foam rubber or the like between the front member 1 of the lens and the face 6 of the tube 4.

As in the first example, the lens illustrated in Figure 2 consists of two single glasses 1 and 2 and a pair of glasses 3 cemented together. The single front lens 1 is mechanically mounted in the usual manner by means of a screw ring 11 in a tube 12. The tube 12 of the mount is equipped with three spring tongues 12′ uniformly distributed over the periphery, each of which is cemented at one point to the cylindrical bounding surface of the glass 2. A tube 13, screwed to the tube 12, is equipped with three spring tongues 13′ evenly spaced around its circumference, each of which is cemented at one point to the cylindrical bounding surface of the glass 3.

Prior to the cementing of the glass 2 to the tube 4 (Figure 1) or to the tongues 12′ (Figure 2), the glass 2 must be adjusted to its proper position relative to the glass 1 by means of a suitable adjusting apparatus which does not form part of the mount. The cementing then takes place, whereupon the adjusting equipment must be removed and the glass 3 brought into its proper position relative to the glasses 1 and 2 by renewed temporary use of the adjusting equipment. Finally it is cemented to the tube 4 (Figure 1) or to the tongues 13′ (Figure 2).

In Figure 5 the front glass 15 of a two glass lens system is fixed in a tube-shaped mount part 14 in the usual manner in such a way that its optical axis X—X coincides with that of the mount part. In order to enable the rear glass 16 to be adjusted to its proper position relative to the front glass 15, the part 14 of the mount must be placed by means of a flange 17 on a cylindrical casing 18 in such a way that its axis coincides with the optical axis X—X. A cylindrical body 19 is mounted in the casing 18 so as to be finely adjustable in the direction of the axis X—X, and on the front wall 20 of said body 19 is disposed the holder 21 of a ring knife-edge 22 so as to be slidable, by means of two adjusting screws 23 (only one of which is shown in the drawing), in relation to the casing 18 and hence in relation to the part 14 of the mount in two directions at right-angles to each other and to the axis X—X. In the casing 18 opposite each adjusting screw 23 is a pin 24, which is slidable at right-angles to the axis X—X, and which, actuated by a spring 25, presses the holder 21 against the adjusting screw 23. The glass 16 is mounted on the ring knife-edge 22. By means of two adjusting screws 26 (only one of which is shown in the drawing) and which penetrate through holes in the mount part 14, said glass 16 can be displaced relative to the mount part 14 in two directions at right-angles to one other and to the axis X—X. In the casing 18, a pin 27 is mounted opposite each adjusting screw 26 so as to be slidable at right-angles to the axis X—X and penetrates through an aperture in the mount part 14 and, actuated by a spring 28, presses the glass 16 against the adjusting screw 26.

The above described arrangement for adjusting glass 16 relative to the mount part 14 is allotted for the purpose of adjusting the glass 16 relative to the glass 15, to an auto-collimation telescope, which contains a lens 29 and an eyepiece 30, which have a common optical axis Y—Y. The lens 29 is disposed to be slidable in the direction of the optical axis Y—Y. 31 denotes a mark lying in the focal plane of the eyepiece. It is constructed as cross-hairs, the hairs of which intersect in the optical axis Y—Y. Between said mark and the lens 29 a beam splitting cube 32 is disposed in the path of the rays, to which cube a second mark 34, illuminated by a light source 33, is so allotted as to be reversely identical to the mark 31.

In order to adjust the glass 16 relative to the glass 15, the axis Y—Y of the autocollimation telescope must be brought into such a position that it coincides with the optical axis X—X of the glass 15. The centre of curvature $M_1$ of the front surface of the glass 15 then lies on the axis Y—Y. The glass 16 which is mounted on the ring knife-edge 22 must then be brought by adjusting the body 19 axially into that position in which the distance between the centre of the front surface of the glass 16 and the rear surface of the glass 15 has the prescribed value $l$. The lens 29 must thereupon be adjusted axially in such manner that an image of the mark 34, produced on the rear surface of the glass 16 after the reflection of the depicting rays, lies in the focal plane of eyepiece 30, whereupon the holder 21 together with the rink knife-edge 22 are adjusted relative to the body 19 by means of the adjusting screws 23 in such manner that the centre of curvature $M_4$ of the rear surface of the glass 16 lies on the axis Y—Y, which can be seen by the coincidence of that image of the mark 34 with the mark 31. The lens 29 must then be adjusted axially in such manner that an image of the mark 34, produced on the front surface of the glass 16 after the reflection of the depicting rays, lies in the focal plane of the eyepiece 30, whereupon the glass 16 is adjusted by means of the adjusting screws 26 relative to the ring knife edge 22 in such manner that the centre of curvature $M_3$ of the front surface of the glass 16 lies on the axis Y—Y which can be seen by the coincidence of this latter image with the mark 31.

After these adjustments the glass 16 is in its proper prescribed position relative to the glass 15 and it can now be fixed in the mount part 14, by applying cement at three points, spaced as uniformly as possible over the circumference, between the inner wall of the mount part 14 and the cylindrical bounding surface of the glass 16. After the hardening of the cement the mount part 14 can be removed from the casing 18. During the removal the adjusting screws 26 and the pins 27 should be moved into a position such that they do not impede the removal.

I claim:

A mount for a multi-element optical lens system comprising a cylindrically-shaped mounting tube, a plurality of short tubular shaped rings supported in coaxial relation in the said mounting tube, a plurality of axially extending elastic spring tongues uniformly distributed over the end of each of the short tubular shaped rings and adapted to contact the periphery of a lens element positioned axially of said mounting tube, cementing means attached at one point of the free ends of the said spring tongues and to the cylindrical bounding peripheral surface of the lens element, and means for securing each of said short tubular shaped rings in axial alignment and axially separated apart in said mounting tube whereby the lens elements of the composite multi-element optical objective may be adjusted and mounted therein in proper positions relative to each other and with the lens elements free from clamping forces and distortions.

References Cited in the file of this patent

UNITED STATES PATENTS

| | | |
|---|---|---|
| 859,215 | Guilbert | July 9, 1907 |
| 930,210 | Mills | Aug. 3, 1909 |
| 1,722,520 | Glancy | July 30, 1929 |
| 2,240,827 | Bangert et al. | May 6, 1941 |
| 2,245,257 | Crumrine | June 10, 1941 |
| 2,258,223 | Sachtleben | Oct. 7, 1941 |
| 2,259,006 | Simmons | Oct. 14, 1941 |
| 2,341,364 | Crumrine | Feb. 8, 1944 |
| 2,381,098 | Bahn | Aug. 7, 1945 |
| 2,394,721 | Simmons et al. | Feb. 12, 1946 |

OTHER REFERENCES

"Optical Workshop Principles," Charles Deve, 1943, 306 pages, published and supplied by Jarrell-Ash Co., 165 Newbury St., Boston, Mass., pages 252–261 cited.